United States Patent
Chen et al.

(10) Patent No.: US 11,231,268 B2
(45) Date of Patent: Jan. 25, 2022

(54) SINUSOIDAL FREQUENCY SWEEPING INTERFEROMETRIC ABSOLUTE DISTANCE MEASUREMENT APPARATUS AND METHOD WITH DYNAMIC OFFSET FREQUENCY LOCKING

(71) Applicant: ZHEJIANG SCI-TECH UNIVERSITY, Zhejiang (CN)

(72) Inventors: Benyong Chen, Zhejiang (CN); Jiandong Xie, Zhejiang (CN); Liping Yan, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 16/968,611

(22) PCT Filed: Nov. 29, 2019

(86) PCT No.: PCT/CN2019/122036
§ 371 (c)(1),
(2) Date: Aug. 10, 2020

(87) PCT Pub. No.: WO2020/244176
PCT Pub. Date: Dec. 10, 2020

(65) Prior Publication Data
US 2021/0025689 A1 Jan. 28, 2021

(30) Foreign Application Priority Data
Jun. 6, 2019 (CN) .......................... 201910492671.7

(51) Int. Cl.
*G01B 9/02* (2006.01)

(52) U.S. Cl.
CPC ....... *G01B 9/02004* (2013.01); *G01B 9/0207* (2013.01); *G01B 2290/70* (2013.01)

(58) Field of Classification Search
CPC ............ G01B 9/02003; G01B 9/02004; G01B 9/02007; G01B 9/02008; G01B 9/0207
See application file for complete search history.

(56) References Cited

U.S. PATENT DOCUMENTS 5,835,199 A 11/1998 Phillips et al.
9,835,441 B2 * 12/2017 Chen ....................... G01S 7/499
(Continued)

FOREIGN PATENT DOCUMENTS

| CN | 102183234 | 9/2011 |
|---|---|---|
| CN | 103364775 | 10/2013 |

(Continued)

OTHER PUBLICATIONS

"International Search Report (Form PCT/ISA/210) of PCT/CN2019/122036," dated Mar. 6, 2020, pp. 1-4.

*Primary Examiner* — Michael A Lyons
(74) *Attorney, Agent, or Firm* — JCIPRNET

(57) ABSTRACT

A reference laser beam locked to a femtosecond optical frequency comb is modulated through a high frequency electro-optic phase modulator, and laser sidebands with equal intervals are generated. Beat frequency is performed on the sixth-order sideband and the frequency sweeping laser beam, a beat signal and a frequency sweeping signal source are down-mixed to generate a difference frequency signal, and the difference frequency signal is locked to a reference clock through a digital phase detector and a PID controller. The frequency sweeping laser beam is locked to reference laser beam with a dynamic offset frequency under the closed loop control, and sinusoidal frequency sweeping is simultaneously performed together with the frequency sweeping signal source. The locked laser beam is used for absolute distance measurement, and a distance to be measured is obtained according to the synthetic wavelength transition theory.

5 Claims, 2 Drawing Sheets

(56) References Cited

U.S. PATENT DOCUMENTS

| | | | | |
|---|---|---|---|---|
| 2007/0024860 A1* | 2/2007 | Tobiason | ............ | G01B 9/02081 356/498 |
| 2011/0211198 A1* | 9/2011 | Koda | ................. | G01B 9/02007 356/499 |
| 2013/0222785 A1* | 8/2013 | Sasaki | ................ | G01B 9/02004 356/4.09 |
| 2015/0019160 A1* | 1/2015 | Thurner | ............. | G01B 9/02007 702/150 |
| 2015/0331109 A1* | 11/2015 | Christensen | .......... | G01S 7/4808 356/4.1 |

FOREIGN PATENT DOCUMENTS

| | | |
|---|---|---|
| CN | 106025787 | 10/2016 |
| CN | 110174058 | 8/2019 |

\* cited by examiner

SINUSOIDAL FREQUENCY SWEEPING INTERFEROMETRIC ABSOLUTE DISTANCE MEASUREMENT APPARATUS AND METHOD WITH DYNAMIC OFFSET FREQUENCY LOCKING

CROSS-REFERENCE TO RELATED APPLICATION

This application is a 371 of international application of PCT application serial no. PCT/CN2019/122036, filed on Nov. 29, 2019, which claims the priority benefit of US application no. 201910492671.7 filed on Jun. 6, 2019. The entirety of each of the above mentioned patent applications is hereby incorporated by reference herein and made a part of this specification.

BACKGROUND OF THE INVENTION

Technical Field

The disclosure relates to the technical field of laser interferometric measurement, and in particular, to a sinusoidal frequency sweeping interferometric absolute distance measurement apparatus and method with dynamic offset frequency locking.

Description of Related Art

The laser frequency sweeping interferometry is widely applied to the field of absolute distance measurement because of its advantages such as large measurement range and high relative accuracy. The key technique in the laser frequency sweeping interferometry is the control and measurement of laser frequency sweeping. Conventionally, to achieve linear sweeping of laser frequency, the current of laser diode is linearly modulated in an open loop. The frequency sweeping precision provided by this method is low. Therefore, during the frequency sweeping, an additional etalon (a reference interferometer or an FP interferometer) is required to measure the frequency sweeping amount. The etalons used in these methods are susceptible to external factors such as ambient temperature, thus, the measurement accuracy of the frequency sweeping amount is not sufficiently high and the measurement accuracy of absolute distance may not be further improved. A frequency sweeping heterodyne interferometer without the need of an etalon is later developed. Nevertheless, such interferometer is susceptible to polarization leakage, exhibits a non-linear error, and requires a large laser frequency sweeping range.

In addition, since the laser frequency and current do not strictly satisfy the linear relationship, the frequency sweeping is not strictly linear, and some errors are thereby introduced. As a new kind of frequency reference, femtosecond optical frequency comb can provide frequency reference with repeat frequency of tens to hundreds of MHz in a large range of tens of THz. Therefore, it has been widely applied to calibration of laser frequency.

In a frequency sweeping interferometry based on the femtosecond optical frequency comb, the laser frequency is required to be pre-locked to a specific comb, and frequency sweeping is started after the laser is unlocked. When the frequency sweeping is completed, the laser frequency is required to be locked to another comb. The amount of frequency sweeping is determined by the comb numbers before and after frequency sweeping. However, performing frequent locking and unlocking requires considerable high performance of the frequency offset locking system. Further, at the instant of unlocking and locking, the laser frequency may jitter and bring additional measurement errors. Large amount of frequency sweeping is required for the foregoing methods. Hundreds of GHz or even the THz is required, and the corresponding frequency sweeping time is up to tens of seconds, leading to low measurement efficiency.

Therefore, how to control a laser to precisely perform frequency sweeping, and how to precisely measure the frequency sweeping amount, and how to improve distance measurement efficiency are key technologies required to be solved.

SUMMARY OF THE INVENTION

In order to solve the problems described in the BACKGROUND section, the disclosure provides a sinusoidal frequency sweeping interferometric absolute distance measurement method with dynamic offset frequency locking through which the problems that the laser frequency is difficult to be precisely controlled, the frequency sweeping amount is difficult to be precisely measured, and low measurement efficiency in a frequency sweeping interferometer are solved.

The technical solutions adopted by the disclosure includes the following.

I. A sinusoidal frequency sweeping interferometric absolute distance measurement apparatus with dynamic offset frequency locking is provided, which includes a reference laser, a first optical fiber beam splitter, an optical fiber beam combiner, a high frequency electro-optic phase modulator, an orthogonal optical fiber beam combiner, a coupler, a locking controller, a femtosecond optical frequency comb, a first high frequency amplifier, a high frequency clock source, a high frequency photodetector, a second high frequency amplifier, a frequency mixer, a third high frequency amplifier, a frequency sweeping signal source, a digital phase detector, a PID controller, a frequency sweeping laser, and a second optical fiber beam splitter. An output end of the reference laser are connected to one input end of the locking controller, the input end of the high frequency electro-optic phase modulator, and one input end of the orthogonal optical fiber beam combiner respectively through the first optical fiber beam splitter. Another input end of the locking controller is connected to an output end of the femtosecond optical frequency comb, and an output end of the locking controller is connected to a current control end of the reference laser. The high frequency clock source is connected to a modulation control end of the high frequency electro-optic phase modulator through the first high frequency amplifier, and an output end of the high frequency electro-optic phase modulator is connected to one input end of the optical fiber beam combiner. An output end of the frequency sweeping laser is connected to another input end of the optical fiber beam combiner and another input end of the orthogonal optical fiber beam combiner respectively through the second optical fiber beam splitter. An output end of the optical fiber beam combiner is connected to the high frequency photodetector, and an output end of the high frequency photodetector is connected to one input end of the frequency mixer through the second high frequency amplifier. The frequency sweeping signal source is connected to another input end of the frequency mixer through the third high frequency amplifier, and an output end of the frequency mixer is connected to a current control end of the frequency sweeping laser through the digital phase detector and the PID controller. An output end of the orthogonal optical fiber beam combiner is connected to a Michelson interferometer through the coupler.

Laser beam emitted by the reference laser is divided into three laser beams with a power ratio of 70:20:10 after passing through the first optical fiber beam splitter, and the laser beam with the power ratio of 10% output by the first optical fiber beam splitter and laser beam output by the femtosecond optical frequency comb enter the locking controller together. The locking controller generates a feedback control signal to the reference laser and locks the laser frequency of the reference laser to the femtosecond optical frequency comb. Laser beam emitted by the frequency sweeping laser is divided into two beams with a power ratio of 90:10 after passing through the second optical fiber beam splitter. The laser beam with the power ratio of 10% output by the second optical fiber beam splitter and a laser sideband generated by the high frequency electro-optic phase modulator enter the optical fiber beam combiner together and transmitted to the high frequency photodetector to produce a beat signal, and the beat signal is input to the frequency mixer after being amplified by the second high frequency amplifier. At the same time, a high frequency sinusoidal signal with continuously variable frequency generated by the frequency sweeping signal source enters the frequency mixer after being amplified by the third high frequency amplifier together with the beat signal amplified by the second high frequency amplifier for down-mixing to obtain a difference frequency signal. The difference frequency signal is input to a digital phase detector, the digital phase detector calculates the phase error between the difference frequency signal and a reference clock. The feedback control signal is obtained after the phase error is processed by the PID controller, and the feedback control signal is input to the current control end of the frequency sweeping laser for closed-loop laser frequency control.

The sinusoidal frequency sweeping interferometric absolute distance measurement apparatus with dynamic offset frequency locking further includes an atomic clock, where the locking controller, the femtosecond optical frequency comb, the high frequency clock source, the frequency sweeping signal source, and the digital phase detector are all connected to the same atomic clock.

The Michelson interferometer includes a reference cube-corner prism 7, a first low frequency electro-optic phase modulator 8, a second low frequency electro-optic phase modulator 9, a beam splitting prism, a measurement cube-corner prism, a polarizing beam splitting prism, a first photodetector, a second photodetector, a second analog-to-digital converter, a first analog-to-digital converter, and a field programmable gate array (FPGA) signal processor. The beam output from the orthogonal optical fiber beam combiner is divided into transmitted measurement beam and reflected reference beam after passing through the beam splitting prism: the measurement beam returns back to the beam splitting prism in parallel after being reflected by the measurement cube-corner prism to form a measurement optical path. The reference beam is input to the reference cube-corner prism after being modulated by the first low frequency electro-optic phase modulator and the second low frequency electro-optic phase modulator and returns back to the beam splitting prism in parallel after being reflected by the reference cube-corner prism to form the reference optical path. The measurement beam and the reference beam returning back to the beam splitting prism are combined and then divided into two beams including transmitted beam of a P polarization state and reflected beam of an S polarization state after passing through the polarizing beam splitting prism, the beam of the P polarization state is irradiated to the first photodetector 27 to be detected, and the beam of the S polarization state is irradiated to the second photodetector 28 to be detected. Output ends of the first photodetector and the second photodetector are connected to the field programmable gate array (FPGA) signal processor respectively through the first analog-to-digital converter and the second analog-to-digital converter for performing data processing.

A laser beam with a power ratio of 70% output by the first optical fiber beam splitter and a laser beam with a power ratio of 90% output by the second optical fiber beam splitter are input into the orthogonal optical fiber beam combiner together, and the orthogonal optical fiber beam combiner combines reference laser beam with a power ratio of 70% output by the first optical fiber beam splitter and frequency sweeping laser beam with a power ratio of 90% output by the second optical fiber beam splitter into an orthogonal beam according to the P polarization state and the S polarization state respectively. The orthogonal beam is converted into space beam after passing through the coupler, and the space beam is incident on the Michelson interferometer including the beam splitting prism, the reference cube-corner prism, and the measurement cube-corner prism to perform absolute distance measurement. The space beam is divided into transmitted measurement beam and reflected reference beam after passing through the beam splitting prism: the measurement beam returns back to the beam splitting prism in parallel after being reflected by the measurement cube-corner prism to form the measurement optical path. The reference beam is input to the reference cube-corner prism after being modulated by the first low frequency electro-optic phase modulator and the second low frequency electro-optic phase modulator and returns back to the beam splitting prism in parallel after being reflected by the reference cube-corner prism to form the reference optical path. The measurement beam and the reference beam returning back to the beam splitting prism are combined and then divided into two beams including the transmitted beam of the P polarization state and the reflected beam of the S polarization state after passing through the polarizing beam splitting prism, the beam of the P polarization state generates an interference signal $S_1(t)$ after being irradiated to the first photodetector, and the beam of the S polarization state generates an interference signal $S_2(t)$ after being irradiated to the second photodetector. The two interference signals $S_1(t)$ and $S_2(t)$ enter the field programmable gate array (FPGA) signal processor for data processing after being respectively sampled by the first analog-to-digital converter and the second analog-to-digital converter.

The first low frequency electro-optic phase modulator and the second low frequency electro-optic phase modulator are vertically placed.

II. A sinusoidal frequency sweeping interferometric absolute distance measurement method with dynamic offset frequency locking is provided, and the method includes the following steps.

1) The reference laser is locked to the femtosecond optical frequency comb through the locking controller, and the high frequency electro-optic phase modulator performs high-frequency sinusoidal phase modulation on laser beam output from the reference laser, and laser sidebands with equal frequency intervals are generated and presented as follows:

$$f_{EOM} \pm f_1 + Nf_r,$$

where $f_1$ represents a laser frequency of the reference laser, $f_r$ represents a modulation frequency of the high frequency electro-optic phase modulator, and N represents an order number (N=0, ±1, ±2, ... ) of the laser sidebands generated by modulation.

2) Beat frequency is performed on the laser beam output from the frequency sweeping laser and the laser sidebands of the reference laser output after being modulated by the high frequency electro-optic phase modulator, and a beat signal is measured and amplified by the high frequency photodetector. The frequency of the beat signal between the frequency sweeping laser and the sixth-order laser sideband of the reference laser is:

$$\Delta f_{beat} = f_2 - (f_1 + 6f_r),$$

where $f_2$ represents a laser frequency of the frequency sweeping laser.

Down-mixing is performed on the beat signal and the signal output from the frequency sweeping signal source with a frequency mixer, and a difference frequency signal is obtained as follows:

$$\Delta f_{diff} = f_2 - (f_1 + 6f_r) - [f_o + f_a \sin(2\pi f_{sin} t)],$$

where $f_o$ represents the offset frequency of the frequency sweeping signal source, $f_a$ and $f_{sin}$ respectively represent the sweeping amplitude and the sweeping frequency of the frequency sweeping signal source, and t represents time.

3) The difference frequency signal is locked to the reference clock of the digital phase detector through the digital phase detector and the PID controller. And with dynamic offset frequency locking, the frequency sweeping laser is locked to the reference laser under closed loop control, where the output laser frequency thereof is:

$$f_2 = f_1 + f_b + f_a \sin(2\pi f_{sin} t)$$

$$f_b = 6f_r + f_o + f_{ref},$$

where $f_{ref}$ is a frequency of the reference clock;

4) Laser beam of the reference laser and laser beam of the frequency sweeping laser are combined into one orthogonal beam by the orthogonal optical fiber beam combiner. The orthogonal beam is incident on the Michelson interferometer to perform absolute distance measurement, and in the reference arm of the interferometer, a pair of orthogonal low frequency electro-optic phase modulators is placed to perform low-frequency sinusoidal phase modulation on the reference arm beam. Two interference signals finally generated are detected by the photodetectors (27 and 28) and enter the field programmable gate array (FPGA) signal processor (31) after analog-to-digital conversion, and the following formulas are adopted to obtain the phases of the two interference signals:

$$\varphi_1 = \left(\frac{4\pi L}{\lambda_1}\right) \mathrm{mod}(2\pi) \text{ and}$$

$$\varphi_2 = \left(\frac{4\pi L}{\lambda_2}\right) \mathrm{mod}(2\pi) + \frac{4\pi L}{\lambda_{s1}} \sin(2\pi f_{sin} t),$$

where mod( ) represents a remainder operation, $\lambda_1$ is the wavelength of the reference laser, $\lambda_1 = c/f_1$, $\lambda_2$ is a center wavelength of the frequency sweeping laser, $\lambda_2 = c/(f_1 + f_b)$, $\lambda_{s1}$ represents the synthetic wavelength equivalent to sinusoidal frequency sweeping, $\lambda_{s1} = c/f_a$, L represents a distance to be measured, and c represents a speed of light in vacuum.

5) The following formula is obtained according to phases $\varphi_1$ and $\varphi_2$ of the two interference signals:

$$\Delta\varphi' = \varphi_2 - \varphi_1 \frac{\lambda_1}{\lambda_2} = \frac{4\pi L}{\lambda_{s1}} \sin(2\pi f_{sin} t),$$

where $\Delta\varphi'$ represents the sinusoidal sweeping phase introduced by the sinusoidal frequency sweeping.

A first extraction buffer and a second extraction buffer are provided in the field programmable gate array (FPGA) signal processor, and the two extraction buffers respectively calculate the phases of the two interference signals.

In the field programmable gate array (FPGA) signal processor, time is discrete, that is, $t = T_s k$ ($k = 0, 1, 2, 3 \ldots$), where k represents a time serial number, $T_s$ is data refresh time ($T_s = 1/f_s$), $f_s$ represents the refresh rate of the sinusoidal sweeping phase $\Delta\varphi'$, which is 100 kHz in specific implementation.

The first extraction buffer is constructed to extract the sinusoidal sweeping phase $\Delta\varphi'$ by 2,000 times. The refresh rate of the $\Delta\varphi'$ is reduced to $f_d = f_s/2000 = 50$ Hz after extraction, the data refresh time is $T_d = 1/f_d$ after extraction, and $t = T_d k$ at this time. A queue-like manner is adopted to store the data of the latest cycle of the extracted $\Delta\varphi'$, that is, data with the time series of $k - (N_s - 1)$ to k is stored. A time series difference between the stored data and the data at time k is defined as d ($0, 1, 2, 3 \ldots N_s - 1$), where $N_s = f_d/f_{sin}$ represents the total number of data $\Delta\varphi'$ obtained in a sinusoidal sweeping cycle, and the $d^{th}$ data in the first extraction buffer is expressed as follows:

$$\Delta\varphi'_k(d) = \frac{4\pi L}{\lambda_{s1}} \sin[2\pi f_{sin} T_d(k - d)].$$

In the first buffer, using the $0^{th}$ data and the $N_s/4^{th}$ data to obtain the phase corresponding to the sinusoidal frequency sweeping at the time k, which is expressed as:

$$\phi'_k = \sqrt{\Delta\varphi'_k(0)^2 + \Delta\varphi'_k\left(\frac{N_s}{4}\right)^2} = \frac{4\pi L}{\lambda_{s1}}.$$

6) The following formula is obtained according to the phases $\varphi_1$ and $\varphi_2$ of the two interference signals:

$$\Delta\varphi'' = \varphi_2 - \varphi_1 = \left(\frac{4\pi L}{\lambda_{s2}}\right) \mathrm{mod}(2\pi) + \frac{4\pi L}{\lambda_{s1}} \sin(2\pi f_{sin} t) \text{ and}$$

$$\lambda_{s2} = \lambda_1 \lambda_2 / (\lambda_1 - \lambda_2),$$

where $\Delta\varphi''$ represents a composite phase including a synthetic wavelength fractional phase and the sinusoidal sweeping phase, $\lambda_{s2}$ represents a synthetic wavelength formed by the wavelength $\lambda_1$ of the reference laser and the center wavelength $\lambda_2$ of the frequency sweeping laser, and $$\left(\frac{4\pi L}{\lambda_{s2}}\right) \mathrm{mod}(2\pi)$$

is the fractional phase corresponding to the synthetic wavelength $\lambda_{s2}$ to be solved.

The second extraction buffer is constructed to extract the composite phase $\Delta\varphi''$ by 2,000 times, and a queue-like manner is adopted to store the data of the latest cycle of the Δφ″, so that the dth data in the second extraction buffer is expressed as follows:

$$\Delta\varphi_k''(d) = \left(\frac{4\pi L}{\lambda_{s2}}\right)\mathrm{mod}(2\pi) + \frac{4\pi L}{\lambda_{s1}}\sin[2\pi f_{sin}T_d(k-d)].$$

In the second buffer, using the 0th data and the Ns/2th data to obtain the fractional phase corresponding to the synthetic wavelength $\lambda_{s2}$ at the time k, which is expressed as:

$$\phi_k'' = \frac{\Delta\varphi_k''(0) + \Delta\varphi_k''\left(\frac{N_s}{2}\right)}{2} = \left(\frac{4\pi L}{\lambda_{s2}}\right)\mathrm{mod}(2\pi).$$

7) Combining the phase corresponding to the sinusoidal frequency sweeping and the fractional phase corresponding to the synthetic wavelength $\lambda_{s2}$, the precise measurement result of the distance to be measured is calculated by:

$$L_k' = \lambda_{s1} \cdot \frac{\phi_k'}{4\pi} \text{ and}$$

$$L_k'' = \left(\mathrm{int}\left[\frac{2L_k'}{\lambda_{s2}} + 0.5 - \frac{\phi_k''}{2\pi}\right] + \frac{\phi_k''}{2\pi}\right)g\frac{\lambda_{s2}}{2},$$

where int[ ] represents a floor integer operation and $L_k''$ represents the final and precise distance to be measured.

Compared to the related art, advantages of the disclosure include the following.

(1) In the disclosure, the sinusoidal laser frequency sweeping implemented based on the dynamic offset frequency locking technique may be traced to the atomic clock, so that the frequency sweeping accuracy is high, and an additional device is not required to measure the frequency sweeping amount.

(2) In the disclosure, although an additional laser is not used, the center wavelength of the frequency sweeping laser and the wavelength of the reference laser are adopted to form the synthetic wavelength. In this way, the laser frequency sweeping interferometry and the laser synthetic wavelength interferometry are realized, and measurement accuracy and measurement efficiency for measuring an absolute distance are enhanced.

(3) For the phase modulation of the interference signals, in the disclosure, characteristics of the sinusoidal frequency sweeping are adopted to calculate and obtain the sinusoidal frequency sweeping phase and the synthetic wavelength, and that the phase measurement accuracy and refresh rate are improved.

(4) The sinusoidal frequency sweeping implemented in the disclosure is continuous frequency sweeping, so that a switching process of locking and unlocking is not required during sweeping, and high stability is thereby provided.

To sum up, the problems that the laser frequency is difficult to be precisely controlled and the frequency sweeping amount is difficult to be precisely measured in the frequency sweeping interferometry are solved, so that accuracy and efficiency of absolute distance measurement are enhanced, and the disclosure may thus be widely applied to the technical field of interference measurement.

DESCRIPTION OF THE EMBODIMENTS

The disclosure is further described in detail in combination with accompanying figures, and specific embodiments are provided as follows.

Figure 1:
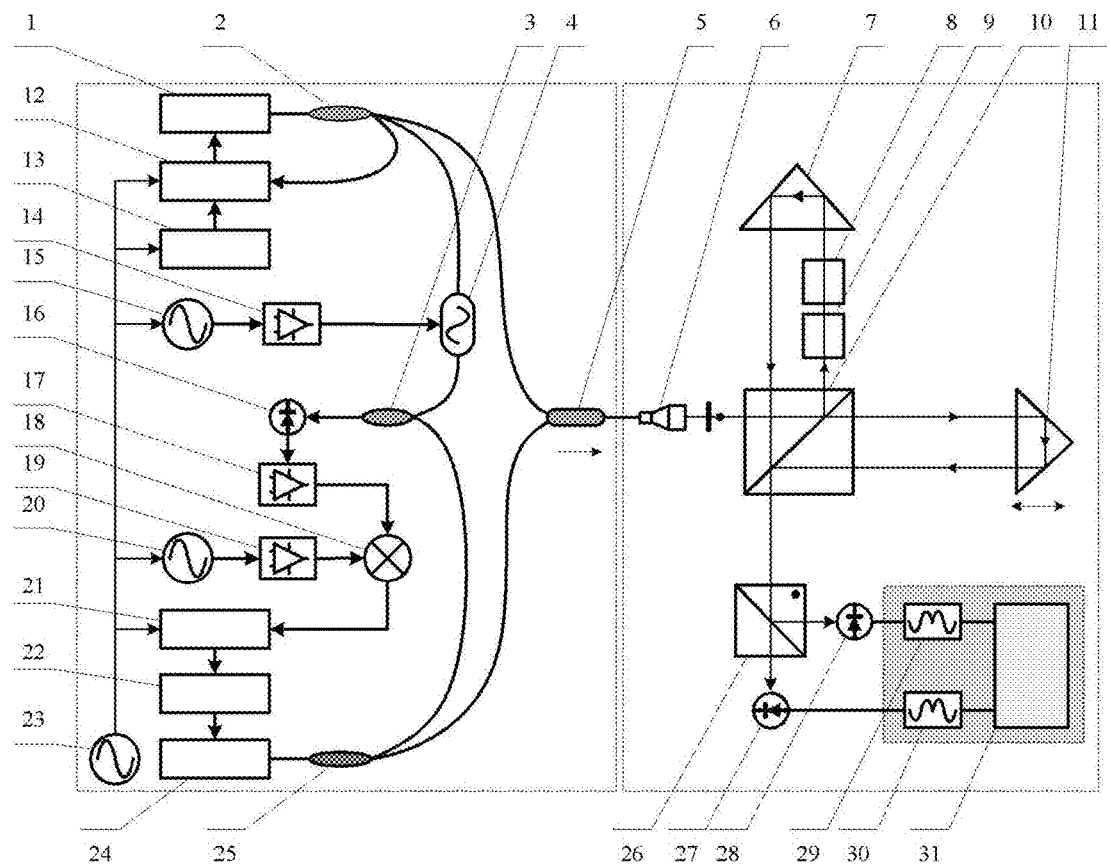
FIG. 1 is a block diagram of the principle of the sinusoidal frequency sweeping interferometric absolute distance measurement method with dynamic offset frequency locking.

As shown in FIG. 1, a distance measurement device provided by the disclosure includes a reference laser 1, a first optical fiber beam splitter 2, an optical fiber beam combiner 3, a high frequency electro-optic phase modulator 4, an orthogonal optical fiber beam combiner 5, a coupler 6, a locking controller 12, a femtosecond optical frequency comb 13, a first high frequency amplifier 14, a high frequency clock source 15, a high frequency photodetector 16, a second high frequency amplifier 17, a frequency mixer 18, a third high frequency amplifier 19, a frequency sweeping signal source 20, a digital phase detector 21, a PID controller 22, a frequency sweeping laser 24, and a second optical fiber beam splitter 25.

As shown in FIG. 1, an output end of the reference laser 1 is connected to one input end of the locking controller 12, an input end of the high frequency electro-optic phase modulator 4, and one input end of the orthogonal optical fiber beam combiner 5 respectively through the first optical fiber beam splitter 2. Another input end of the locking controller 12 is connected to an output end of the femtosecond optical frequency comb 13, and an output end of the locking controller 12 is connected to a current control end of the reference laser 1. The high frequency clock source 15 is connected to a modulation control end of the high frequency electro-optic phase modulator 4 through the first high frequency amplifier 14, and an output end of the high frequency electro-optic phase modulator 4 is connected to one input end of the optical fiber beam combiner 3.

As shown in FIG. 1, an output end of the frequency sweeping laser 24 is connected to another input end of the optical fiber beam combiner 3 and another input end of the orthogonal optical fiber beam combiner 5 respectively through the second optical fiber beam splitter 25. An output end of the optical fiber beam combiner 3 is connected to the high frequency photodetector 16, and an output end of the high frequency photodetector 16 is connected to one input end of the frequency mixer 18 through the second high frequency amplifier 17. The frequency sweeping signal source 20 is connected to another input end of the frequency mixer 18 through the third high frequency amplifier 19, and an output end of the frequency mixer 18 is connected to a current control end of the frequency sweeping laser 24 through the digital phase detector 21 and the PID controller 22. An output end of the orthogonal optical fiber beam combiner 5 is connected to a Michelson interferometer through the coupler 6.

First, laser beam emitted by the reference laser 1 is divided into three laser beams with a power ratio of 70:20:10 after passing through the first optical fiber beam splitter 2, where the laser beam with the power ratio of 10% output by the first optical fiber beam splitter 2 and laser beam output by the femtosecond optical frequency comb 13 enter the locking controller 12 together. The locking controller 12 generates a feedback control signal to the reference laser 1 and locks the laser frequency of the reference laser 1 to the femtosecond optical frequency comb 13.

The laser beam with the power ratio of 20% output by the first optical fiber beam splitter 2 generates laser sidebands with equal frequency intervals after being modulated through the high frequency electro-optic phase modulator 4. The modulation signal of the high frequency electro-optic phase modulator 4 is output by the high frequency clock source 15 and is amplified and generated through the first high frequency amplifier 14.

The frequency of the laser sidebands may be presented as follows:

$$f_{EOM} = f_1 + Nf_r \quad (1),$$

where $f_1$ represents a laser frequency of the reference laser 1, $f_r$=12 GHz represents a frequency of the modulation signal of the high frequency electro-optic phase modulator 4, and N represents an order number (N=0, ±1, ±2, . . . ) of the laser sidebands generated through modulation.

Laser beam emitted by the frequency sweeping laser 24 is divided into two laser beam beams with a power ratio of 90:10 after passing though the second optical fiber beam splitter 25. The laser beam with the power ratio of 10% output by the second optical fiber beam splitter 25 and the laser sidebands generated by the high frequency electro-optic phase modulator 4 enter the optical fiber beam combiner 3 together. The combined beam is received by the high frequency photodetector 16 to produce a beat signal, and the beat signal is input to the frequency mixer 18 after being amplified by the second high frequency amplifier 17.

The frequency of beat signal formed by the sweeping laser 24 and the sixth-order laser sideband generated by the high frequency electro-optic phase modulator 4 is expressed as follows:

$$\Delta f_{beat} = f_2 - (f_1 + 6f_r) \quad (2),$$

where $f_2$ represents the laser frequency of the frequency sweeping laser 24.

At the same time, a high frequency sinusoidal signal with continuously variable frequency generated by the frequency sweeping signal source 20 enters the frequency mixer 18 after being amplified by the third high frequency amplifier 19 together with the beat signal amplified by the second high frequency amplifier 17 for down-mixing to obtain a difference frequency signal.

The frequency of the difference frequency signal is represented as follows:

$$\Delta f_{diff} = f_2 - (f_1 + 6f_r) - [f_o + f_a \sin(2\pi f_{sin} t)] \quad (3),$$

where $f_o$=3 GHz represents a shift frequency of the frequency sweeping signal source 20, $f_a$ and $f_{sin}$ respectively represent the sweeping amplitude and the sweeping frequency of the frequency sweeping signal source 20 and are equal to 1.1 GHz and 0.5 Hz respectively, and t represents time.

The difference frequency signal is input to the digital phase detector 21, the digital phase detector 21 calculates the phase error between the difference frequency signal and the reference clock ($f_{ref}$=60 MHz), and the reference clock is provided by an atomic clock 23. The feedback control signal is obtained after the phase error is processed by the PID controller 22, and the feedback control signal is input to the current control end of the frequency sweeping laser 24 for closed-loop laser frequency control. Under the closed loop control, the phase error is rapidly adjusted to zero, and at the same time, the frequency of the difference frequency signal is locked to the reference clock, that is, the frequency of difference frequency signal is equal to the frequency of reference clock.

Under the locking condition, the frequency sweeping signal source 20 is controlled to perform sinusoidal frequency sweeping, and under the closed loop control, the frequency sweeping laser 24 is maintained to be locked to the reference laser 1, that is, dynamic offset frequency locking is performed. Finally, the frequency sweeping laser 24 and the frequency sweeping signal source 20 simultaneously perform sinusoidal frequency sweeping.

Figure 2:
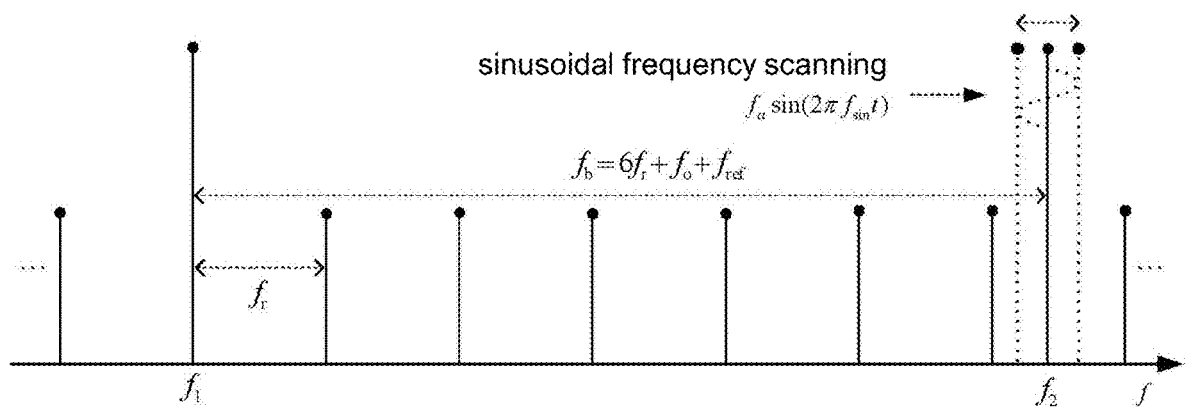
FIG. 2 is a schematic chart of laser frequency relationships during sinusoidal frequency sweeping.

FIG. 2 is the schematic chart of laser frequency relationships during sinusoidal frequency sweeping, where the laser frequency of the frequency sweeping laser 24 is presented as follows:

$$f_2 = f_1 + f_b + f_a \sin(2\pi f_{sin} t) \quad (4),$$

where $f_b = 6f_r + f_o + f_{ref} = 75.06$ GHz.

In the embodiment, the atomic clock 23 is further included, and the locking controller 12, the femtosecond optical frequency comb 13, the high frequency clock source 15, the frequency sweeping signal source 20, and the digital phase detector 21 are all connected to the same atomic clock 23. Reference clocks of the locking controller 12, the femtosecond optical frequency comb 13, the high frequency clock source 15, the frequency sweeping signal source 20, and the digital phase detector 21 may all be traced to the same atomic clock featuring favorable stability. Since dynamic offset frequency locking technique with excellent performance is adopted, precise sinusoidal frequency sweeping is provided by the frequency sweeping laser 24. And an additional etalon is not required to be used to measure the frequency sweeping amount. In addition, the sinusoidal frequency sweeping may be continuously performed, and the dynamic locking state is maintained during frequency sweeping, so that locking and unlocking are not required.

The Michelson interferometer includes a reference cube-corner prism 7, a first low frequency electro-optic phase modulator 8, a second low frequency electro-optic phase modulator 9, a beam splitting prism 10, a measurement cube-corner prism 11, a polarizing beam splitting prism 26, a first photodetector 27, a second photodetector 28, a second analog-to-digital converter 29, a first analog-to-digital converter 30, and a field programmable gate array (FPGA) signal processor 31. The output end of the orthogonal optical fiber beam combiner 5 is divided into transmitted measurement beam and reflected reference beam after passing through the beam splitting prism 10: the measurement beam returns back to the beam splitting prism 10 in parallel after being reflected by the measurement cube-corner prism 11 to form the measurement optical path. The reference beam is input to the reference cube-corner prism 7 after being modulated by the first low frequency electro-optic phase modulator 8 and the second low frequency electro-optic phase modulator 9 and returns back to the beam splitting prism 10 in parallel after being reflected by the reference cube-corner prism 7 to form the reference optical path. The measurement beam and the reference beam returning back to the beam splitting prism 10 are combined and then divided into two beams including transmitted beam of a P polarization state and reflected beam of an S polarization state after passing through the polarizing beam splitting prism 26, the beam of the P polarization state is irradiated to the first photodetector 27 to be detected, and the beam of the S polarization state is irradiated to the second photodetector 28 to be detected. Output ends of the first photodetector 27 and the second photodetector 28 are connected to the field programmable gate array (FPGA) signal processor 31 respectively through the first analog-to-digital converter 30 and the second analog-to-digital converter 29 for performing data processing.

The laser beam with the power ratio of 70% output by the first optical fiber beam splitter 2 and the laser beam with the power ratio of 90% output by the second optical fiber beam splitter 25 are input into the orthogonal optical fiber beam combiner (5) together, and the orthogonal optical fiber beam combiner 5 combines reference laser beam with a power ratio of 70% output by the first optical fiber beam splitter 2 and frequency sweeping laser beam with a power ratio of 90% output by the second optical fiber beam splitter 25 into an orthogonal beam according to the P polarization state and the S polarization state respectively. The orthogonal beam is converted into space beam after passing through the coupler 6, and the space beam is incident on the Michelson interferometer including the beam splitting prism 10, the reference cube-corner prism 7, and the measurement cube-corner prism 11 to perform absolute distance measurement.

The space beam is divided into transmitted measurement beam and reflected reference beam after passing through the beam splitting prism 10: the measurement beam returns back to the beam splitting prism 10 in parallel after being reflected by the measurement cube-corner prism 11 to form the measurement optical path (a measurement arm). The reference beam is input to the reference cube-corner prism 7 after being modulated by the first low frequency electro-optic phase modulator 8 and the second low frequency electro-optic phase modulator 9 and returns back to the beam splitting prism 10 in parallel after being reflected by the reference cube-corner prism 7 to form the reference optical path (a reference arm). The measurement cube-corner prism 11 is fixed on and moves along with an object to be measured.

The measurement beam and the reference beam returning back to the beam splitting prism 10 are combined and then divided into two beams including transmitted beam of the P polarization state and reflected beam of the S polarization state after passing through the polarizing beam splitting prism 26. The transmitted beam is of the P polarization state, and the beam of the P polarization state generates an interference signal $S_1(t)$ after being irradiated to the first photodetector 27, while the reflected beam is S polarization state, and the beam of the S polarization state generates an interference signal $S_2(t)$ after being irradiated to the second photodetector 28. The two interference signals $S_1(t)$ and $S_2(t)$ enter the field programmable gate array (FPGA) signal processor 31 for data processing after being respectively sampled by the first analog-to-digital converter 30 and the second analog-to-digital converter 29.

The first low frequency electro-optic phase modulator 8 and the second low frequency electro-optic phase modulator 9 are vertically placed.

In the reference optical path, the vertically-placed first low frequency electro-optic phase modulator 8 and the second low frequency electro-optic phase modulator 9 respectively performs low frequency sinusoidal phase modulation on laser beam of the P and S polarization states in the reference beam. The modulation depth corresponding to the sinusoidal phase modulation is adjusted to 2.63 radians in advance, and the carrier phase delay is adjusted to zero in advance as well. That is, a non-linear error in a subsequent PGC phase demodulation process is not required to be considered.

Figure 3:
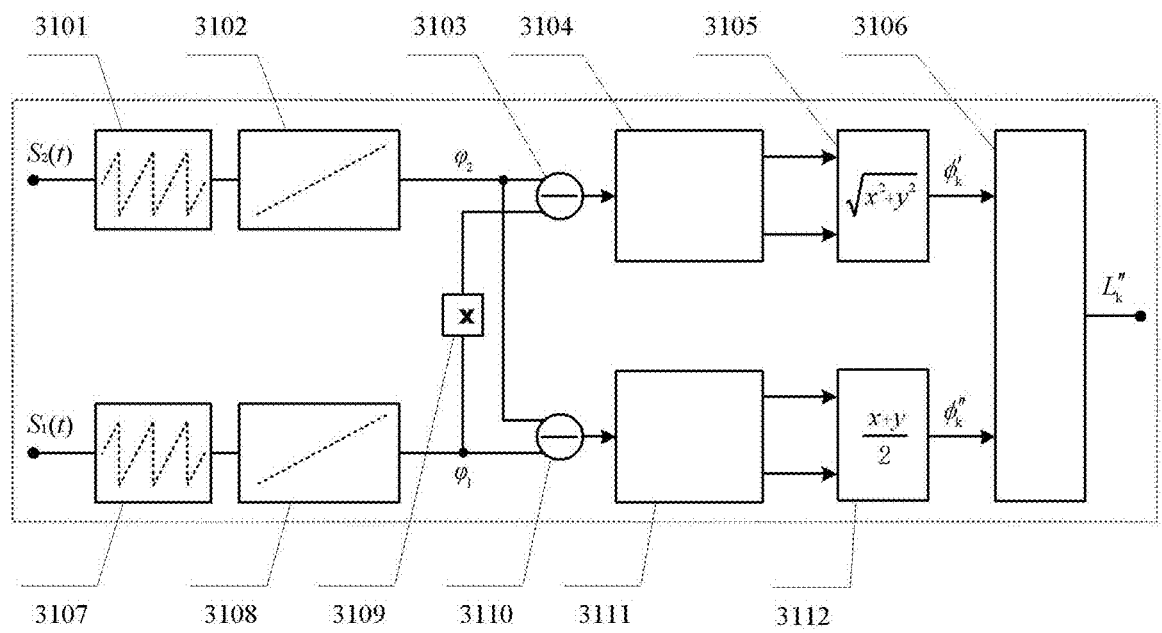
FIG. 3 is a block diagram of signal processing of the sinusoidal frequency sweeping interferometric absolute distance measurement method with dynamic offset frequency locking.

As shown in FIG. 3, the two interference signals are input into a first subtractor 3103 and a second subtractor 3110 after respectively passing through PGC phase demodulation modules 3101 and 3107 and phase unwrapping modules 3102 and 3108 thereof. One output of phase unwrapping module 3108 of interference signal is input to the first subtractor 3103 through a multiplier. Outputs of the first subtractor 3103 and the second subtractor 3110 are input to amplitude calculation modules 3105 and 3112 after passing through extraction buffers 3104 and 3111 thereof respectively. Outputs of the two amplitude calculation modules 3105 and 3112 are finally input to the absolute distance calculation module 3106.

FIG. 3 further describe the signal processing method in the field programmable gate array (FPGA) signal processor 31 in FIG. 1. The interference signals $S_1(t)$ and $S_2(t)$ entering into the field programmable gate array (FPGA) signal processor 31 are presented as follows:

$$S_1(t) = A\cos[m\cdot\sin(\omega_c t) + \varphi_1] \quad (5) \text{ and}$$

$$S_2(t) = A\cos[m\cdot\sin(\omega_c t) + \varphi_2] \quad (6),$$

where m and co, respectively represent the modulation depth and the angular frequency of the sinusoidal phase modulation, A represents the signal amplitude, and $\varphi_1$ and $\varphi_2$ respectively represent interference phases of the reference laser 1 and the frequency sweeping laser 24.

During the sinusoidal frequency sweeping, the phases $\varphi_2$ and $\varphi_1$ of interference signals $S_2(t)$ and $S_1(t)$ are obtained by using the first PGC phase demodulation module 3101, the first phase unwrapping module 3102 and the second PGC phase demodulation module 3107, the second phase unwrapping module 3108. Relationships among the phases $\varphi_1$ and $\varphi_2$, the laser wavelength, and the distance to be measured are presented as follows:

$$\varphi_1 = \left(\frac{4\pi L}{\lambda_1}\right)\mod(2\pi) \quad (7)$$

$$\varphi_2 = \left(\frac{4\pi L}{\lambda_2}\right)\mod(2\pi) + \frac{4\pi L}{\lambda_{s1}}\sin(2\pi f_{sin}t). \quad (8)$$

Herein, mod( ) represents a remainder operation, $\lambda_1 = c/f_1$ is the wavelength of the reference laser 1, $\lambda_2 = c/(f_1+f_b)$ is the center wavelength of the frequency sweeping laser 24, $\lambda_{s1} = c/f_a = 136.269$ mm represents the minimum synthetic wavelength equivalent to the sinusoidal frequency sweeping, L represents the distance to be measured, $4\pi/\lambda_{s1}$ represents the phase corresponding to the sinusoidal frequency sweeping to be solved, and c represents the speed of light in vacuum. At this time, the refresh rate of the $\varphi_1$ and $\varphi_2$ is $f_s = 100$ kHz.

The first subtractor 3103 subtracts the product of the $\varphi_1$ and the coefficient $\lambda_1/\lambda_2$ obtained by the multiplier 3109 from the $\varphi_2$, and the sinusoidal sweeping phase introduced by the sinusoidal frequency sweeping is obtained:

$$\Delta\varphi' = \varphi_2 - \varphi_1\frac{\lambda_1}{\lambda_2} = \frac{4\pi L}{\lambda_{s1}}\sin(2\pi f_{sin}t). \quad (9)$$

In the field programmable gate array (FPGA) signal processor, time is discrete time, that is, $t=T_s k$ ($k=0, 1, 2, 3 \ldots$), where $T_s$ is data refresh time ($T_s=1/f_s$), and k represents the time serial number. The first extraction buffer 3104 extracts the $\Delta\varphi'$ by 2,000 times first, the data refresh rate is $f_d=f_s/2000=50$ Hz after extraction, and the data refresh time is $T_d=1/f_d$ after extraction, and $t=T_d k$ at this time. The number of data in a sinusoidal sweeping cycle after extraction is equal to $f_d/f_{sin}$. A queue-like manner is adopted to store the data of the latest cycle of the extracted $\Delta\varphi'$, that is, data with the time series of $k-(N_s-1)$ to k is stored. A time series difference between the stored data and the data at time k is defined as d (0, 1, 2, 3 … $N_s-1$), and the $d^{th}$ data in the first extraction buffer 3104 is expressed as follows:

$$\Delta\varphi'_k(d) = \frac{4\pi L}{\lambda_{s1}} \sin[2\pi f_{sin} T_d (k-d)]. \qquad (10)$$

In the first extraction buffer 3104, the $0^{th}$ data and the $N_s/4^{th}$ data are presented as follows:

$$\Delta\varphi'_k(0) = \frac{4\pi L}{\lambda_{s1}} \sin(2\pi f_{sin} T_d k) \text{ and} \qquad (11)$$

$$\Delta\varphi'_k\left(\frac{N_s}{4}\right) = -\frac{4\pi L}{\lambda_{s1}} \cos(2\pi f_{sin} T_d k). \qquad (12)$$

It is obvious that the two data represented by formulas (11) and (12) are orthogonal, and the phase sweeping amount corresponding to the sinusoidal frequency sweeping is further obtained through the sum of square operation and the square root operation performed by the amplitude calculation module 3105:

$$\phi'_k = \sqrt{\Delta\varphi'_k(0)^2 + \Delta\varphi'_k\left(\frac{N_s}{4}\right)^2} = \frac{4\pi L}{\lambda_{s1}}. \qquad (13)$$

On the other hand, the second subtractor 3110 subtracts $\varphi_1$ from $\varphi_2$, and a composite phase including the synthetic wavelength fractional phase and the sinusoidal sweeping phase is obtained:

$$\Delta\varphi''_k = \varphi_2 - \varphi_1 \qquad (14)$$
$$= \left(\frac{4\pi L}{\lambda_{s2}}\right) \mod(2\pi) + \frac{4\pi L}{\lambda_{s1}} \sin(2\pi f_{sin} t),$$

where $\lambda_{s2}=\lambda_1\lambda_2/(\lambda_1-\lambda_2)=3.994$ mm, that is, equal to the synthetic wavelength formed by the wavelength $\lambda_1$ of the reference laser 1 and the center wavelength $\lambda_2$ of the frequency sweeping laser 24.

$$\left(\frac{4\pi L}{\lambda_{s2}}\right) \mod(2\pi)$$

is the fractional phase corresponding to the synthetic wavelength $\lambda_{s2}$ to be solved.

The second extraction buffer 3111 extracts the $\Delta\varphi''$ by 2,000 times, and a queue-like manner is adopted to store the data of the latest cycle of the $\Delta\varphi''$, so that the $d^{th}$ data in the second extraction buffer 3111 is presented as follows:

$$\Delta\varphi''_k(d) = \left(\frac{4\pi L}{\lambda_{s2}}\right) \mod(2\pi) + \frac{4\pi L}{\lambda_{s1}} \sin[2\pi f_{sin} T_d (k-d)]. \qquad (15)$$

In the second extraction buffer 3111, the $0^{th}$ data and the $N_s/4^{th}$ data are presented as follows:

$$\Delta\varphi''_k(0) = \left(\frac{4\pi L}{\lambda_{s2}}\right) \mod(2\pi) + \frac{4\pi L}{\lambda_{s1}} \sin(2\pi f_{sin} T_d k) \text{ and} \qquad (16)$$

$$\Delta\varphi''_k\left(\frac{N_s}{2}\right) = \left(\frac{4\pi L}{\lambda_{s2}}\right) \mod(2\pi) - \frac{4\pi L}{\lambda_{s1}} \sin(2\pi f_{sin} T_d k). \qquad (17)$$

The fractional phase corresponding to the synthetic wavelength $\lambda_{s2}$ is further obtained through a mean calculation module 3112:

$$\phi''_k = \frac{\Delta\varphi''_k(0) + \Delta\varphi''_k\left(\frac{N_s}{2}\right)}{2} = \left(\frac{4\pi L}{\lambda_{s2}}\right) \mod(2\pi). \qquad (18)$$

According to the phase sweeping amount corresponding to the sinusoidal frequency sweeping measured and obtained through formula (13), the distance initial measurement result of the sinusoidal frequency sweeping calculated and obtained in the absolute distance calculation module 3106 is:

$$L'_k = \lambda_{s1} \cdot \frac{\phi'_k}{4\pi}.$$

Benefited from the precise frequency sweeping, the distance initial measurement range may reach 100 m, and when relative phase discrimination precision is 1%, the initial measurement resolution is $\lambda_{s1} \times 0.5 \times 1\% = 0.68$ mm. In combination with the fractional phase corresponding to the synthetic wavelength $\lambda_{s2}$ measured and obtained through formula (18), according to the synthetic wavelength transition theory, the precise measurement result of the distance to be measured is further calculated:

$$L''_k = \left(\text{int}\left[\frac{2L'_k}{\lambda_{s2}} + 0.5 - \frac{\phi''_k}{2\pi}\right] + \frac{\phi''_k}{2\pi}\right) g \frac{\lambda_{s2}}{2}, \qquad (19)$$

where int[ ] represents a floor integer operation.

The measurement ranges corresponding to the precise measurement result and the initial measurement result are the same. When the relative phase discrimination precision is 1%, the precise measurement resolution is $\lambda_{s2} \times 0.5 \times 1\% = 19.97$ μm. That is, high-precision measurement with 19.97 μm resolution in the range of 100 m may be finally achieved. In addition, in the calculation process, the refresh rates of the phase measurement result and the distance measurement result are both equal to $f_d$. In this method, $f_d=50$ Hz, that is, the measurement result is refreshed 50 times per second, so that highly efficient absolute distance measurement is achieved.

In view of the foregoing, in the disclosure, without the use of an additional laser, the laser frequency sweeping interferometry and the laser synthetic wavelength interferometry are realized, and the measurement precision and measurement efficiency for measuring an absolute distance are enhanced. Regarding the interference signal processing, the phase measurement precision and the refresh rate are further improved, and since the switching process of locking and unlocking is not required during sweeping, high stability is provided.

The above embodiment is intended to explain the present invention, but not to limit the present invention. Any modification and change made to the present invention within the protection scope of the spirit and the Claims of the present invention fall in the protection scope of the present invention.

What is claimed is:

1. A sinusoidal frequency sweeping interferometric absolute distance measurement apparatus with dynamic offset frequency locking, comprising a reference laser (1), a first optical fiber beam splitter (2), an optical fiber beam combiner (3), a high frequency electro-optic phase modulator (4), an orthogonal optical fiber beam combiner (5), a coupler (6), a locking controller (12), a femtosecond optical frequency comb (13), a first high frequency amplifier (14), a high frequency clock source (15), a high frequency photodetector (16), a second high frequency amplifier (17), a frequency mixer (18), a third high frequency amplifier (19), a frequency sweeping signal source (20), a digital phase detector (21), a PID controller (22), a frequency sweeping laser (24), and a second optical fiber beam splitter (25);

wherein an output end of the reference laser (1) is connected to one input end of the locking controller (12), an input end of the high frequency electro-optic phase modulator (4), and one input end of the orthogonal optical fiber beam combiner (5) respectively through the first optical fiber beam splitter (2), another input end of the locking controller (12) is connected to an output end of the femtosecond optical frequency comb (13), an output end of the locking controller (12) is connected to a current control end of the reference laser (1), the high frequency clock source (15) is connected to a modulation control end of the high frequency electro-optic phase modulator (4) through the first high frequency amplifier (14), and an output end of the high frequency electro-optic phase modulator (4) is connected to one input end of the optical fiber beam combiner (3);

wherein an output end of the frequency sweeping laser (24) is connected to another input end of the optical fiber beam combiner (3) and another input end of the orthogonal optical fiber beam combiner (5) respectively through the second optical fiber beam splitter (25), an output end of the optical fiber beam combiner (3) is connected to the high frequency photodetector (16), an output end of the high frequency photodetector (16) is connected to one input end of the frequency mixer (18) through the second high frequency amplifier (17), the frequency sweeping signal source (20) is connected to another input end of the frequency mixer (18) through the third high frequency amplifier (19), and an output end of the frequency mixer (18) is connected to a current control end of the frequency sweeping laser (24) through the digital phase detector (21) and the PID controller (22);

wherein an output end of the orthogonal optical fiber beam combiner (5) is connected to a Michelson interferometer through the coupler (6).

2. The sinusoidal frequency sweeping interferometric absolute distance measurement apparatus with dynamic offset frequency locking according to claim 1, wherein a laser beam emitted by the reference laser (1) is divided into three laser beams with a power ratio of 70:20:10 after passing through the first optical fiber beam splitter (2), wherein the laser beam with the power ratio of 10% output by the first optical fiber beam splitter (2) and laser beam output by the femtosecond optical frequency comb (13) enter the locking controller (12) together, the locking controller (12) generates a feedback control signal to the reference laser (1) and locks a laser frequency of the reference laser (1) to the femtosecond optical frequency comb (13);

wherein a laser beam emitted by the frequency sweeping laser (24) is divided into two laser beams with a power ratio of 90:10 after passing through the second optical fiber beam splitter (25), and the laser beam with the power ratio of 10% output by the second optical fiber beam splitter (25) and laser sidebands generated by the high frequency electro-optic phase modulator (4) enter the optical fiber beam combiner (3) together, the combined beam is received by the high frequency photodetector (16) to produce a beat signal, and the beat signal is input to the frequency mixer (18) after being amplified by the second high frequency amplifier (17), wherein at a same time, a high frequency sinusoidal signal with continuously variable frequency generated by the frequency sweeping signal source (20) enters the frequency mixer (18) after being amplified by the third high frequency amplifier (19) together with the beat signal amplified by the second high frequency amplifier (17) for down-mixing to obtain a difference frequency signal;

wherein the difference frequency signal is input to the digital phase detector (21), the digital phase detector (21) calculates a phase error between the difference frequency signal and a reference clock, the feedback control signal is obtained after the phase error is processed by the PID controller (22), and the feedback control signal is input to the current control end of the frequency sweeping laser (24) for closed-loop laser frequency control.

3. The sinusoidal frequency sweeping interferometric absolute distance measurement apparatus with dynamic offset frequency locking according to claim 1, further comprising:

an atomic clock (23), wherein the locking controller (12), the femtosecond optical frequency comb (13), the high frequency clock source (15), the frequency sweeping signal source (20), and the digital phase detector (21) are all connected to the same atomic clock (23).

4. The sinusoidal frequency sweeping interferometric absolute distance measurement apparatus with dynamic offset frequency locking according to claim 1, wherein the Michelson interferometer comprises a reference cube-corner prism (7), a first low frequency electro-optic phase modulator (8), a second low frequency electro-optic phase modulator (9), a beam splitting prism (10), a measurement cube-corner prism (11), a polarizing beam splitting prism (26), a first photodetector (27), a second photodetector (28), a first analog-to-digital converter (30), a second analog-to-digital converter (29), and a field programmable gate array (FPGA) signal processor (31);

wherein the output end of the orthogonal optical fiber beam combiner (5) is divided into transmitted measurement beam and reflected reference beam after passing through the beam splitting prism (10);

the measurement beam returns back to the beam splitting prism (10) in parallel after being reflected by the measurement cube-corner prism (11) to form a measurement path;

wherein the reference beam is input to the reference cube-corner prism (7) after being modulated by the first low frequency electro-optic phase modulator (8) and the second low frequency electro-optic phase modulator 19) and returns back to the beam splitting prism (10) in parallel after being reflected by the reference cube-corner prism (7) to form a reference path;

wherein the measurement beam and the reference beam returning back to the beam splitting prism (10) are combined and then divided into two beams including transmitted beam of a P polarization state and reflected beam of an S polarization state after passing through the polarizing beam splitting prism (26), the beam of the P polarization state is irradiated to the first photodetector (27) to be detected and received, and the beam of the S polarization state is irradiated to the second photodetector (28) to be detected and received;

wherein output ends of the first photodetector (27) and the second photodetector (28) are connected to the field programmable gate array (FPGA) signal processor (31) respectively through the first analog-to-digital converter (30) and the second analog-to-digital converter (29) for performing data processing.

5. The sinusoidal frequency sweeping interferometric absolute distance measurement apparatus with dynamic offset frequency locking according to claim 4, wherein a laser beam with a power ratio of 70% output by the first optical fiber beam splitter (2) and a laser beam with a power ratio of 90% output by the second optical fiber beam splitter (25) are input into the orthogonal optical fiber beam combiner (5) together, and the orthogonal optical fiber beam combiner (5) combines reference laser beam with a power ratio of 70% output by the first optical fiber beam splitter (2) and frequency sweeping laser beam with a power ratio of 90% output by the second optical fiber beam splitter (25) into an orthogonal beam according to the P polarization state and the S polarization state respectively;

wherein the orthogonal beam is converted into space beam after passing through the coupler (6), and the space beam is incident on the Michelson interferometer including the beam splitting prism (10), the reference cube-corner prism (7), and the measurement cube-corner prism (11) to perform absolute distance measurement;

wherein the space beam is divided into transmitted measurement beam and reflected reference beam after passing through the beam splitting prism (10):

the measurement beam returns back to the beam splitting prism (10) in parallel after being reflected by the measurement cube-corner prism (11) to form the measurement path;

wherein the reference beam is input to the reference cube-corner prism (7) after being modulated by the first low frequency electro-optic phase modulator (8) and the second low frequency electro-optic phase modulator (9) and returns back to the beam splitting prism (10) in parallel after being reflected by the reference cube-corner prism (7) to form the reference path;

wherein the measurement beam and the reference beam returning back to the beam splitting prism (10) are combined and then divided into two beams including the transmitted beam of the P polarization state and the reflected beam of the S polarization state after passing through the polarizing beam splitting prism (26), the beam of the P polarization state generates an interference signal $S_1(t)$ after being irradiated to the first photodetector (27), and the beam of the S polarization state generates an interference signal $S_2(t)$ after being irradiated to the second photodetector (28);

wherein the two interference signals $S_1(t)$ and $S_2(t)$ enter the field programmable gate array (FPGA) signal processor (31) for data processing after being respectively sampled by the first analog-to-digital converter (30) and the second analog-to-digital converter (29).

* * * * *